US011935379B2

(12) United States Patent
Bornstein

(10) Patent No.: US 11,935,379 B2
(45) Date of Patent: *Mar. 19, 2024

(54) SECURITY ADAPTOR DEVICES FOR THIRD-PARTY SENSORS IN PREMISES SECURITY SYSTEMS

(71) Applicant: The ADT Security Corporation, Boca Raton, FL (US)

(72) Inventor: Jeron E. Bornstein, Delray Beach, FL (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,768

(22) Filed: Sep. 7, 2023

(65) Prior Publication Data

US 2023/0419804 A1 Dec. 28, 2023

Related U.S. Application Data

(63) Continuation of application No. 18/194,200, filed on Mar. 31, 2023, now Pat. No. 11,783,687.

(60) Provisional application No. 63/354,099, filed on Jun. 21, 2022.

(51) Int. Cl.
*G08B 13/22* (2006.01)

(52) U.S. Cl.
CPC .................................... *G08B 13/22* (2013.01)

(58) Field of Classification Search
CPC ....................................................... G08B 13/22
See application file for complete search history.

(56) References Cited

U.S. PATENT DOCUMENTS

| | | | | |
|---|---|---|---|---|
| 6,822,568 | B2 * | 11/2004 | Gehlot | G08B 13/1427 340/568.1 |
| 7,126,467 | B2 | 10/2006 | Albert et al. | |
| 7,956,740 | B2 * | 6/2011 | Myers | G08B 25/14 714/39 |
| 8,548,607 | B1 | 10/2013 | Belz et al. | |
| 8,994,530 | B2 * | 3/2015 | Amis | G08B 13/16 340/568.8 |
| 10,075,334 | B1 | 9/2018 | Kozura et al. | |

(Continued)

FOREIGN PATENT DOCUMENTS

GB 2198527 A 6/1988

*Primary Examiner* — Travis R Hunnings
(74) *Attorney, Agent, or Firm* — Christopher & Weisberg, P.A.

(57) ABSTRACT

According to one or more embodiments, a premises security system includes a sensor adaptor device mountable on a third-party sensor. The sensor adaptor device comprises at least one terminal in electrical communication with a preconfigured premises device of a premise security system, and processing circuitry configured to: store a mapping of a plurality of third-party sensor signals to a plurality of translated third-party signals, detect a first third-party sensor signal emitted from the third-party sensor, determine that the first third-party sensor signal maps to a first translated third-party signal based on the mapping, and in response to determining that the first third-party sensor signal maps to the first translated third-party signal, trigger, via the at least one terminal where the preconfigured premises device to cause the preconfigured premise device to transmit an alert signal to the premises security system.

20 Claims, 6 Drawing Sheets

(56) References Cited

U.S. PATENT DOCUMENTS

| | | | | |
|---|---|---|---|---|
| 10,313,393 | B1 | 6/2019 | Kelly et al. | |
| 11,783,687 | B1 * | 10/2023 | Bornstein | G08B 13/22 340/541 |
| 2009/0135010 | A1 * | 5/2009 | Fosty | G08B 25/08 340/541 |
| 2010/0030838 | A1 | 2/2010 | Atsmon et al. | |
| 2010/0277315 | A1 * | 11/2010 | Cohn | H04L 12/2818 340/541 |
| 2011/0109747 | A1 * | 5/2011 | Forrester | G06F 16/78 340/541 |
| 2015/0364029 | A1 * | 12/2015 | Hicks, III | G08B 13/19697 340/541 |
| 2016/0189527 | A1 * | 6/2016 | Peterson | G08B 31/00 340/541 |
| 2016/0351032 | A1 * | 12/2016 | Herman | G08B 13/22 |
| 2019/0347925 | A1 * | 11/2019 | Faltaous | H04W 4/029 |
| 2020/0126393 | A1 * | 4/2020 | Gerken | G08B 21/22 |
| 2022/0075884 | A1 * | 3/2022 | Hildreth | G06F 21/554 |
| 2023/0154266 | A1 * | 5/2023 | Carter | G07C 9/00571 340/541 |

* cited by examiner

SECURITY ADAPTOR DEVICES FOR THIRD-PARTY SENSORS IN PREMISES SECURITY SYSTEMS

CROSS-REFERENCE TO RELATED PATENT APPLICATION

This application is a continuation of and claims priority to U.S. Utility patent application Ser. No. 18/194,200, filed on Mar. 31, 2023, entitled SECURITY ADAPTOR DEVICES FOR A THIRD-PARTY SENSORS IN PREMISES SECURITY SYSTEMS, which claims priority to U.S. Provisional Patent Application Ser. No. 63/354,099, filed Jun. 21, 2022, entitled NON-INVASIVE METHOD OF CONNECTING A THIRD PARTY SENSOR TO A PREMISES SECURITY SYSTEM, the entirety of both of which are incorporated herein by reference.

TECHNICAL FIELD

The present disclosure relates to methods and premises security systems, and in particular to devices and methods for noninvasively connecting and/or incorporating a third-party sensors to a premises security system.

BACKGROUND

Existing premises security systems monitor a premises for predefined events typically associated with one or more specialized sensors that are in communication with the premises security system. For example, a premises security system may trigger an intrusion alarm when a door/window contact sensor is triggered (e.g., by the opening of the door/window while the system is armed).

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
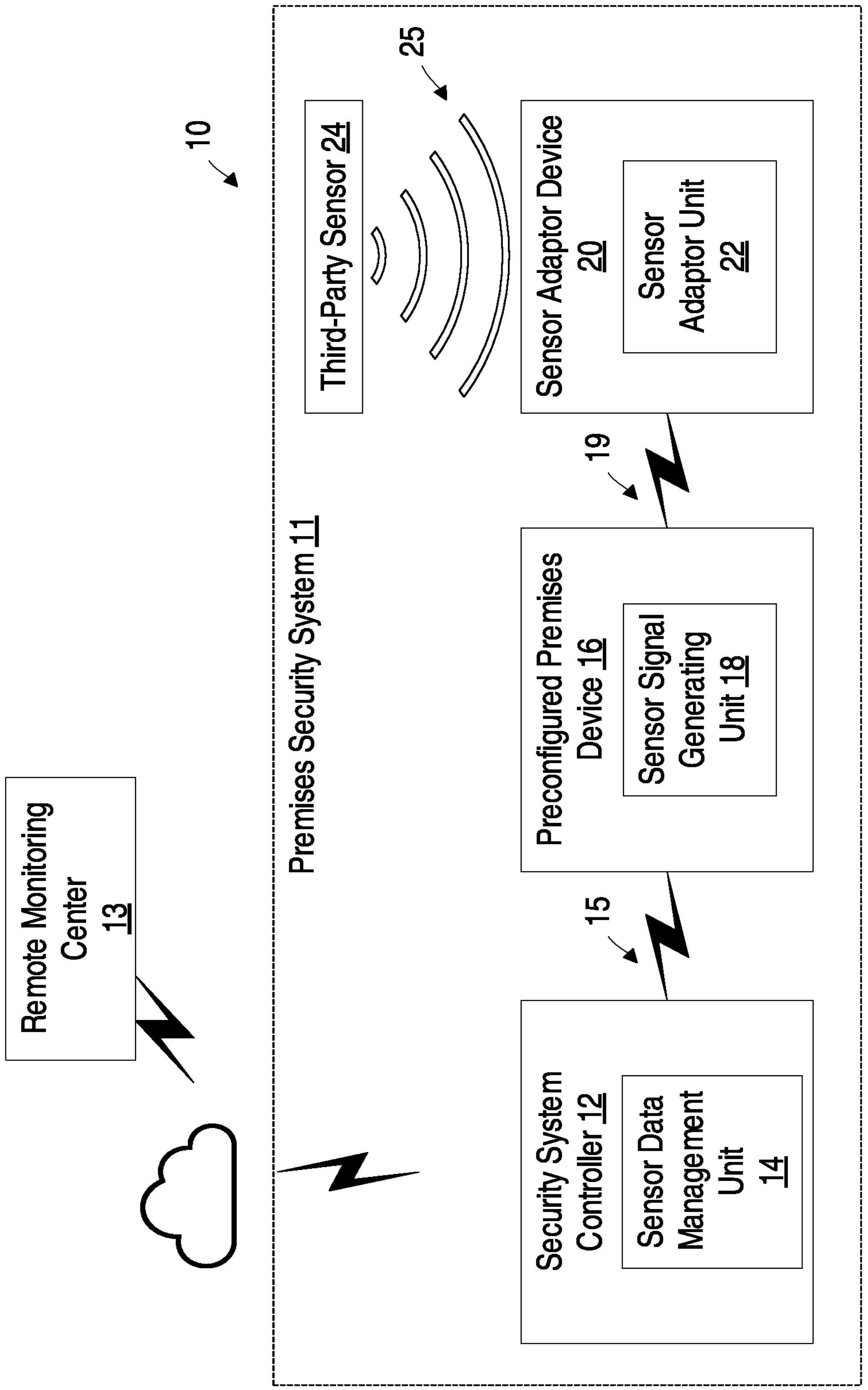
FIG. 1 is a diagram of an example premises security system according to principles disclosed herein.

While many existing sensors are available from various manufacturers, these various sensors may not be configured to communicate with a premises security system, for example, a premises security system designed by a first manufacturer may not be able to communicate with a sensor designed by a different (i.e., a "third-party") manufacturer. Further, although some existing sensors may be configurable for communicating with existing premises security systems, such configuration may require extensive development and/or installation costs, increasing the cost of such products, the time required to develop and/or install such products, and/or limiting the range of sensors available for communication with a premises security system.

For example, existing systems may require installing additional customized software and/or hardware on the sensor to enable communication with the premises security system, and such software/hardware development and installation may demand significant time and financial resources of the premises security system manufacturer, the sensor manufacturer, and/or the end users. Further, in some existing sensors, it may not be commercially or technically feasible to install such software/hardware in a particular sensor.

Hence, existing methods for configuring a sensor, such as a third-party sensor, to communicate and/or integrate with a premises security system suffer from various drawbacks that (1) may increase the cost/complexity/time to development/etc. of configuring the sensor to be able to communicate with the premises security system, (2) may increase the cost/complexity/time/etc. required for installation of the sensor in the premises being secured, and/or (3) may limit the range/type/availability etc. of sensors capable of communication with the premises security system.

Various embodiments of the present disclosure may solve one or more problems with existing systems by providing a low-complexity system and process for integrating detections performed by a third-party sensor into a premises security system, as described herein.

Before describing in detail exemplary embodiments, it is noted that embodiments may reside in combinations of apparatus components and processing steps related to premises security system communicating with a third-party sensor. Accordingly, the system and method components have been represented where appropriate by conventional symbols in the drawings, focusing on details that facilitate understanding the embodiments of the present disclosure so as not to obscure the invention with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. The terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. Multiple components may interoperate and modifications and variations are possible to achieve electrical and data communication. In some embodiments described herein, the term "coupled," "connected," and the like, may be used herein to indicate a connection, although not necessarily directly, and may include wired and/or wireless connections.

Referring now to the drawing figures in which like reference designators refer to like elements there is shown in FIG. 1 a system designated generally as "10." System 10 includes premises security system 11 in which premise security system 11 may include a security system controller 12, including a sensor data management unit 14. Security system controller 12 may provide management functions such as power management, premises device management and alarm management, among other functions. In particular, security system controller 12 may manage one or more life safety and lifestyle features. Life safety features may correspond to security system functions and settings associated with premises conditions that may result in life threatening harm to a person such as carbon monoxide detection, fire detection and intrusion detection. Lifestyle features may correspond to security system functions and settings associated with video capturing devices and non-life-threatening conditions of the premises such as lighting and thermostat functions, among other premises automation functions.

Security system controller 12 may communicate with one or more networks via one or more communication links. In particular, the communications links may be broadband communication links such as a wired cable modem or Ethernet communication link, and digital cellular communication link, e.g., long term evolution (LTE) and/or New Radio (NR) based link, among other broadband communication links known in the art. Broadband as used herein may refer to a communication link other than a plain old telephone service (POTS) line. Ethernet communication link may be an IEEE 802.3 or 802.11 based communication link. The network may be a wide area network, local area network, wireless local network and metropolitan area network, among other networks known in the art. The network provides communications between one or more of security system controller 12 and remote monitoring center 13.

In particular, security system controller 12 may be configured to communicate, via communication channel 15, with a preconfigured premises device 16, which may include a sensor signal generating unit 18. Preconfigured premises device 16 may be configured to communicate, via communication channel 19, with sensor adaptor device 20, which may include a sensor adaptor unit 22. Premises security system 10 further includes third-party sensor 24, which emits signals 25, which may be one or more types of signals (e.g., light signals, audio signals, radio signals, etc.). Sensor adaptor device 20 may be configured to receive/interpret signals 25 emitted by third-party sensor 24.

Preconfigured premises device 16 may be any type of sensor which is configured to communicate with security system controller 12. For example, preconfigured premises device 16 may be a sensor which is designed/manufactured/etc. by the same entity as security system controller 12 (i.e., a "first-party" sensor device), which may be preconfigured to communicate with security system controller 12. Preconfigured premises device 16 may include various safety related sensors such as motion sensors, infrared sensors, fire sensors, heat sensors, carbon monoxide sensors, flooding sensors and contact sensors, window sensors, door sensors, among other sensor types.

Sensor adaptor device 20 may be any type of device which is configured to receive and/or interpret signals 25 emitted by a third-party sensor 24, to generate a translated sensor signal based thereon, and to transmit the translated sensor signal to a preconfigured premises device 16 (e.g., via communication channel 19) for triggering preconfigured premises device 16 into generating and/or sending sensor, security alerts, signaling, and/or data to the security system controller 12 (e.g., via communication channel 15). Security system controller 12 may be configured to perform one or more actions based on the received sensor data, such as sending an alert to remote monitoring center 13.

Third-party sensor 24 may be any type of sensor which is not preconfigured to communicate with security system controller 12. For example, third-party sensor 24 may be a sensor which is designed/manufactured by a third-party (i.e., an entity different than the entity which designed/manufactured the security system controller 12), and consequently lacks one or more capabilities necessary to communicate with security system controller 12. For example, third-party sensor 24 may lack communication hardware and/or software, and/or may be configured to communicate, but such communication cannot be received by security system controller 12. For example, third-party sensor 24 may communicate according to a protocol which is unknown to security system controller 12. Although the term "third-party" is used herein to describe the third-party sensor 24, the scope of the present disclosure is not limited to "third-party" sensors, and may be applicable to any type of sensor that is not configured (or preconfigured) to communicate with a security system controller 12.

Example implementations, in accordance with one or more embodiments, of security system controller 12, preconfigured premises device 16, and sensor adaptor device 20 discussed in the preceding paragraphs will now be described with reference to FIG. 2, FIG. 3, and FIG. 4.

Figure 2:
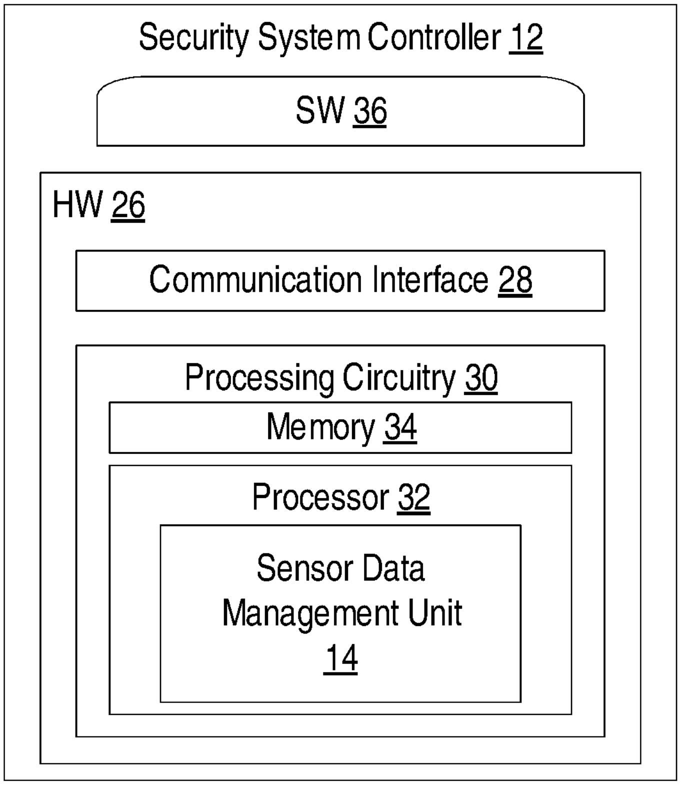
FIG. 2 is a block diagram of an example of a security system controller according to some embodiments of the present disclosure.

With respect to FIG. 2, the premises security system 11 includes a security system controller 12 that includes hardware 26 enabling the security system controller 12 to communicate with one or more entities in premises security system 11 and to perform one or more functions described herein. The hardware 26 may include a communication interface 28 for setting up and maintaining at least a wired and/or wireless connection to one or more entities in premises security system 11 such as preconfigured premises device 16, sensor adaptor device 20, remote monitoring center 13, etc.

In the embodiment shown, the hardware 26 of the security system controller 12 further includes processing circuitry 30. The processing circuitry 30 may include a processor 32 and a memory 34. In particular, in addition to or instead of a processor, such as a central processing unit, and memory, the processing circuitry 30 may comprise integrated circuitry for processing and/or control, e.g., one or more processors, processor cores, field programmable gate arrays (FPGAs) and/or application specific integrated circuits (ASICs) adapted to execute instructions. The processor 32 may be configured to access (e.g., write to and/or read from) the memory 34, which may comprise any kind of volatile and/or nonvolatile memory, e.g., cache and/or buffer memory and/or random access memory (RAM) and/or read-only memory (ROM) and/or optical memory and/or erasable programmable read-only memory (EPROM).

Thus, the security system controller 12 further has software 36 stored internally in, for example, memory 34, or stored in external memory (e.g., database, storage array, network storage device, etc.) accessible by the security system controller 12 via an external connection. The software 36 may be executable by the processing circuitry 30. The processing circuitry 30 may be configured to control any of the methods and/or processes described herein and/or to cause such methods, and/or processes to be performed, e.g., by security system controller 12. Processor 32 corresponds to one or more processors 32 for performing security system controller 12 functions described herein. The memory 34 is configured to store data, programmatic software code and/or other information described herein. In some embodiments, the software 36 may include instructions that, when executed by the processor 32 and/or processing circuitry 30, causes the processor 32 and/or processing circuitry 30 to perform the processes described herein with respect to security system controller 12. For example, processing circuitry 30 of the security system controller 12 may include sensor data management unit 14, which is configured to perform one or more security system controller 12 functions described herein such as with respect to receiving and storing of sensor data received from preconfigured premises device 16, initiating one or more actions based thereon (e.g., sending an alert/message to remote monitoring center 13, placing an emergency call to first responders, triggering an alarm, triggering one or more other preconfigured premises devices 16 to perform one or more actions, etc.), etc.

Figure 3:
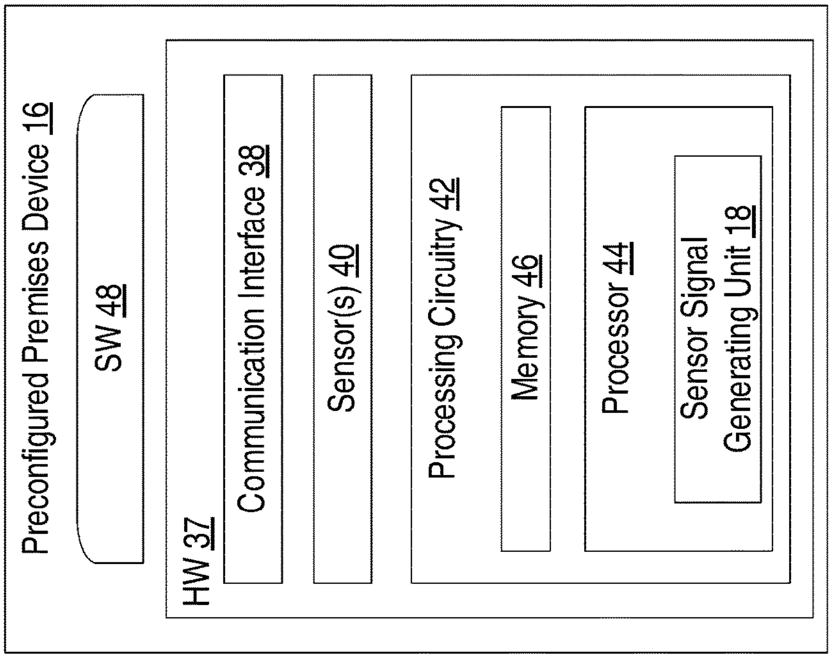
FIG. 3 is a block diagram of an example of a preconfigured premises device according to some embodiments of the present disclosure.

With respect to FIG. 3, the premises security system 11 includes a preconfigured premises device 16 that includes hardware 37 enabling the preconfigured premises device 16 to communicate with one or more entities in premises security system 11 and to perform one or more functions described herein. The hardware 37 may include a communication interface 38 for setting up and maintaining at least a wired and/or wireless connection to one or more entities in premises security system 11 such as security system controller 12, sensor adaptor device 20, etc.

In the embodiment shown, the hardware 37 of the preconfigured premises device 16 further includes one or more sensors 40, which may include, for example, motion sensors, distance sensors, imaging sensors (e.g., infrared sensors, light intensity sensors, light color sensors, etc.), audio sensors, etc.

In the embodiment shown, the hardware 37 of the preconfigured premises device 16 further includes processing circuitry 42. The processing circuitry 42 may include a processor 44 and a memory 46. In particular, in addition to or instead of a processor, such as a central processing unit, and memory, the processing circuitry 42 may comprise integrated circuitry for processing and/or control, e.g., one or more processors, processor cores, FPGAs, and/or ASICs adapted to execute instructions. The processor 44 may be configured to access (e.g., write to and/or read from) the memory 46, which may comprise any kind of volatile and/or nonvolatile memory, e.g., cache, buffer memory, RAM, ROM, optical memory and/or EPROM.

Thus, the preconfigured premises device 16 further has software 48 stored internally in, for example, memory 46, or stored in external memory (e.g., database, storage array, network storage device, etc.) accessible by the preconfigured premises device 16 via an external connection. The software 48 may be executable by the processing circuitry 42. The processing circuitry 42 may be configured to control any of the methods and/or processes described herein and/or to cause such methods, and/or processes to be performed, e.g., by preconfigured premises device 16. Processor 44 corresponds to one or more processors 44 for performing preconfigured premises device 16 functions described herein. The memory 46 is configured to store data, programmatic software code and/or other information described herein. In some embodiments, the software 48 may include instructions that, when executed by the processor 44 and/or processing circuitry 42, causes the processor 44 and/or processing circuitry 42 to perform the processes described herein with respect to preconfigured premises device 16. For example, processing circuitry 42 of the preconfigured premises device 16 may include sensor signal generating unit 18, which is configured to perform one or more preconfigured premises device 16 functions described herein such as with generating sensor signals and/or data, e.g., based on translated sensor signals and/or data received from sensor adaptor device 20, forwarding the generated sensor signals and/or data to security system controller 12, etc.

Figure 4:
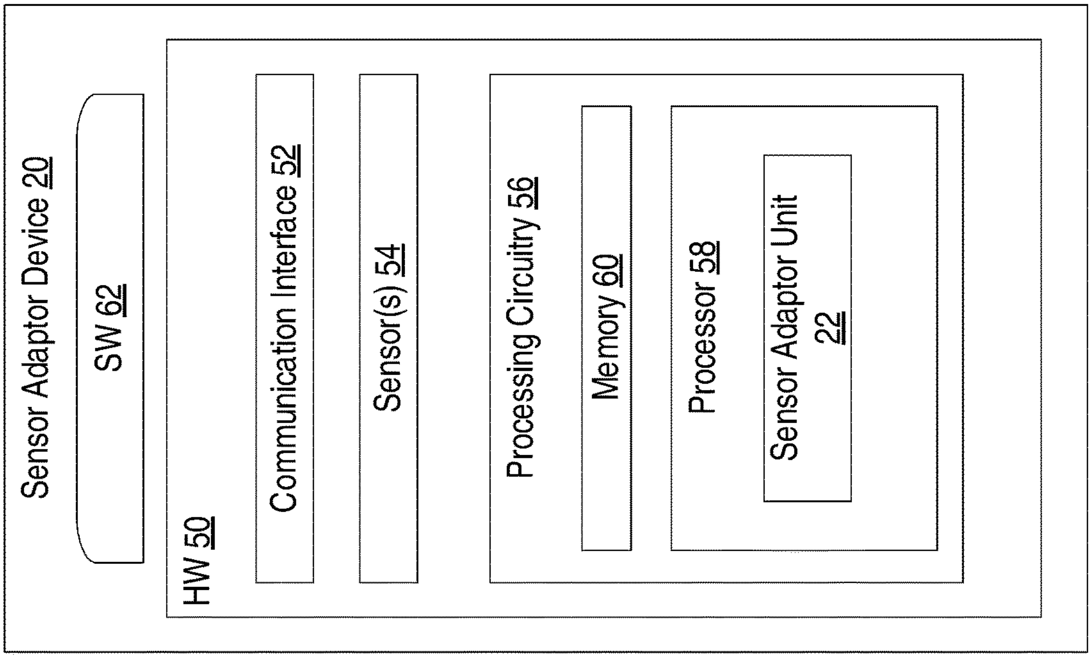
FIG. 4 is a block diagram of an example of a sensor adaptor device according to some embodiments of the present disclosure.

With respect to FIG. 4, the premises security system 11 includes a sensor adaptor device 20 that includes hardware 50 enabling the sensor adaptor device 20 to communicate with one or more entities in premises security system 11 and to perform one or more functions described herein. The hardware 50 may include a communication interface 52 for setting up and maintaining at least a wired and/or wireless connection to one or more entities in premises security system 11 such as preconfigured premises device 16, security system controller 12, etc.

In the embodiment shown, the hardware 50 of the sensor adaptor device 20 further includes processing circuitry 56. The processing circuitry 56 may include a processor 58 and a memory 60. In particular, in addition to or instead of a processor, such as a central processing unit, and memory, the processing circuitry 56 may comprise integrated circuitry for processing and/or control, e.g., one or more processors, processor cores, FPGAs and/or ASICs adapted to execute instructions. The processor 58 may be configured to access (e.g., write to and/or read from) the memory 60, which may comprise any kind of volatile and/or nonvolatile memory, e.g., cache, buffer memory, RAM, ROM, optical memory and/or EPROM.

Thus, the sensor adaptor device 20 further has software 62 stored internally in, for example, memory 60, or stored in external memory (e.g., database, storage array, network storage device, etc.) accessible by the sensor adaptor device 20 via an external connection. The software 62 may be executable by the processing circuitry 56. The processing circuitry 56 may be configured to control any of the methods and/or processes described herein and/or to cause such methods, and/or processes to be performed, e.g., by sensor adaptor device 20. Processor 58 corresponds to one or more processors 58 for performing sensor adaptor device 20 functions described herein. The memory 60 is configured to store data, programmatic software code and/or other information described herein. In some embodiments, the software 62 may include instructions that, when executed by the processor 58 and/or processing circuitry 56, causes the processor 58 and/or processing circuitry 56 to perform the processes described herein with respect to sensor adaptor device 20. For example, processing circuitry 56 of the sensor adaptor device 20 may include sensor adaptor unit 22, which is configured to perform one or more sensor adaptor device 20 functions described herein such as with respect to receiving, interpreting, analyzing, digitizing, reformatting, etc. the signal 25 output by third-party sensor 24, translating the received signal 25, and generating one or more signals (e.g., a preconfigured sensor signal, a translated sensor signal, a data packet, etc.) for sending to the preconfigured premises device 16 (e.g., via communication interface 52, communication channel 19, etc.), for triggering the preconfigured premises device 16 to generate and/or send alerts and/or sensor signaling/data to the security system controller 12.

For example, in some embodiments according to the present disclosure, the sensor adaptor device 20 generates a signal and/or data packet which is based on the received signal 25. For example, in this embodiment, the sensor adaptor device 20 may generate a data packet that may include, for instance, the received signal 25 (e.g., in a digitized format) and/or metadata (e.g., an identity of the third-party sensor 24, a timestamp, a location identifier, etc.). Sensor adaptor device 20 may transmit this data packet to the preconfigured premises device 16, which is configured to forward the data packet on to the security system controller 12 via communication channel 15.

In some embodiments of the present disclosure, the sensor adaptor device 20 generates a signal which is configured to cause the preconfigured premises device 16 to send an alert message to security system controller 12, which may appear to security system controller 12 as if preconfigured premises device 16 was triggered (e.g., may indicate that at least one sensor 40 was triggered). For example, in the case of a preconfigured premises device 16 which includes a motion sensor, the preconfigured premises device 16 may be configured to send a "motion detected" alert to the security system controller 12 indicating that motion has been detected based on detected motion. The sensor adaptor device 20 may send a signal to preconfigured premises device 16, which triggers preconfigured premises device 16 into performing one or more routines based on detected motion, for example, causing preconfigured premises device 16 to send an alert to security system controller 12 according to preconfigured procedures. For example, preconfigured premises device 16 may be preconfigured to receive signals (e.g., via communication interface 52) for control and/or debug functions, and such control/debug functions may include, for example, the capability to trigger an alert (e.g., a "motion detected" alert) based on the received control and/or debug signals. Sensor adaptor device 20 may utilize such known control and/or debug functions (e.g., according to a mapping stored in memory 60) to determine and send a translated signal to preconfigured premises device 16 which is configured to cause preconfigured premises device 16 to perform one or more preconfigured routines (e.g., send a "motion detected" alert to the security system controller 12).

As another example, third-party sensor 24 may be triggered by a security event, and generates a blinking light pattern based thereon. Sensor adaptor device 20 detects the blinking light pattern, and, based on a mapping stored in memory 60, in which the blinking light pattern is mapped to a "motion detected" translated signal, the sensor adaptor device 20 (e.g., using sensor adaptor unit 22) generates the translated signal, and causes the translated signal to be sent to preconfigured premises device 16. Preconfigured premises device 16 may be a motion sensor which is configured to generate a "motion detected" signal based on detected motion (e.g., using sensors 40). Preconfigured premises device 16 may also be configured to generate the "motion detected" signal based on receiving a control and/or debug signal via communication interface 38. The control and/or debug signal(s) may be included in the mapping stored in sensor adaptor device 20, such that the translated signal generated by sensor adaptor device 20 includes the control and/or debug signal(s). Preconfigured premises device 16 thus receives the translated signal, which triggers the "motion detected" signal, which may be then sent to security system controller 12. Security system controller 12 may receive the "motion detected" signal, which may appear to security system controller 12 as if preconfigured premises device 16 itself was triggered by motion (e.g., from sensors 40), even though the initial trigger was actually the third-party sensor 24. Alternatively, in this example, the "motion detected" signal received by security system controller 12 may include some indication that the trigger was not caused by sensors 40 of preconfigured premises device 16, e.g., the "motion detected" signal may indicate that it was triggered by control and/or debug signal(s), and/or may include information (e.g., metadata) identifying the sensor adaptor device 20, third-party sensor 24, etc., which may be communicated to preconfigured premises device 16 by sensor adaptor device 20 (e.g., as part of the control and/or debug signals received via communication interface 38).

In some embodiments, sensor adaptor device 20 may be configured to simulate and/or mimic a security-related event associated with the preconfigured premises device 16. For example, sensors 40 of preconfigured premises device 16 may include an audio sensor that is triggered by a particular sound pattern, frequency, etc., and sensor adaptor device 20 may be configured to generate and/or emit the triggering sound pattern, frequency, etc., e.g., based on a mapping stored in memory 60. As another example, preconfigured premises device 16 may include a light sensor that is triggered by a particular light pattern, color, intensity, etc., and sensor adaptor device 20 may be configured to generate/emit the triggering light pattern, color, etc.

As another example, preconfigured premises device 16 may include a motion sensor, and sensor adaptor device 20 may be configured to send a signal which simulates/mimics a motion signal and causes preconfigured premises device 16 to be triggered as if the preconfigured premises device 16 had actually detected motion (even though, in this case, the motion may have been detected by third-party sensor 24, not by preconfigured premises device 16). Preconfigured premises device 16 may then send a security alert/message to security system controller 12 which may appear to security system controller 12 as if preconfigured premises device 16 was itself triggered. For example, the security alert may include an indication that an event (e.g., motion) was detected by preconfigured premises device 16, even though the event (e.g., motion) may have actually been detected by the third-party sensor 24.

Thus, according to some embodiments of the present disclosure, by using a sensor adaptor device 20, a third-party sensor 24 may be integrated into a premises security system 11 with minimal, if any, modification and/or reconfiguration required of security system controller 12, preconfigured premises device 16, and/or third-party sensor 24.

The third-party sensor 24 may be any device that generates a signal 25 which may be received by and/or interpreted by sensor adaptor device 20. As such, the details of third-party sensor 24 are not shown, although in some embodiments, the third-party sensor 24 may have similar hardware, software and/or sensors as the preconfigured premises device 16 shown in FIG. 3. In some embodiments, third-party sensor 24 may lack one or more elements of preconfigured premises device 16. For example, third-party sensor 24 may lack a communication interface and thus may not be capable of communicating directly with security system controller 12 in the manner of preconfigured premises device 16. As another example, third-party sensor 24 may include a communication interface, but may lack software and/or a sensor signal generating unit which is configured for generating sensor data and communicating the sensor data with security system controller 12.

Although FIGS. 1-4 show sensor data management unit 14, sensor signal generating unit 18, and sensor adaptor unit 22 as being within a respective processor, this unit may instead be implemented such that a portion of the unit is stored in a corresponding memory within the processing circuitry. In other words, the unit may be implemented in hardware or in a combination of hardware and software within the processing circuitry.

Although FIGS. 1-4 depict a single instance of each device, there may instead be multiple security system controllers 12, remote monitoring centers 13, preconfigured premises devices 16, sensor adaptor devices 20, and/or third-party sensors 24 in premises security system 11.

Figure 5:
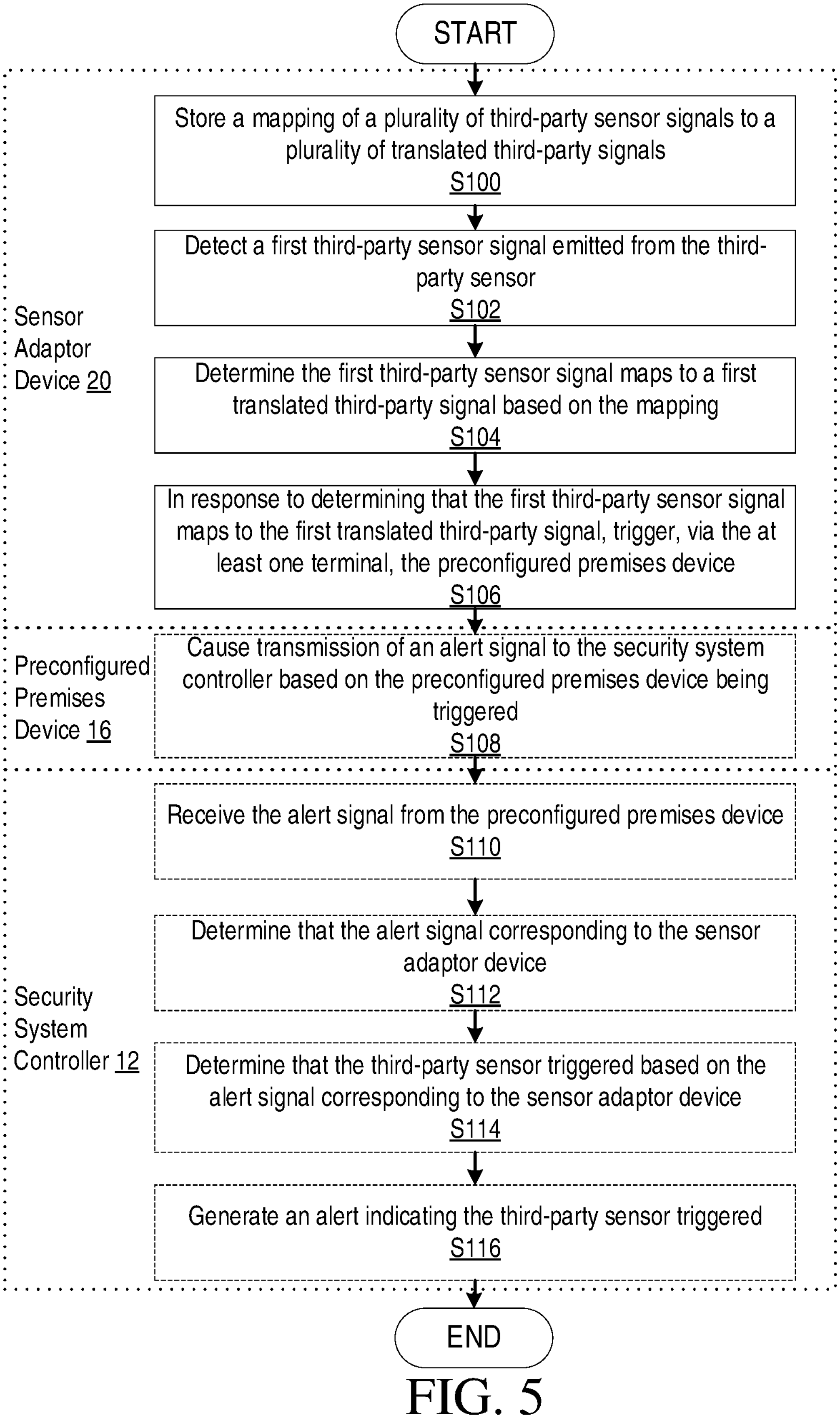
FIG. 5 is a flowchart of an example process according to some embodiments of the present disclosure.

FIG. 5 is a flowchart of an example process according to some embodiments of the present disclosure. One or more blocks described herein may be performed by one or more elements of: sensor adaptor device 20 such as by one or more of processing circuitry 56 (including the sensor adaptor unit 22), processor 58, etc., security system controller 12 such as by one or more of processing circuitry 30 (including the sensor data management unit 14), processor 32, etc., preconfigured premises device 16 such as by one or more of processing circuitry 42 (including sensor signal generating unit 18), processor 44, etc.

According to various embodiments, a premises security system 11 includes a preconfigured premises device 16, a security system controller 12 in communication with the preconfigured premises device 16, and a sensor adaptor device 20 removably mounted to a third-party sensor 24. The sensor adaptor device 20 comprises at least one terminal in electrical communication with a preconfigured premises device 16 of a premise security system 11. The sensor adaptor device 20 further comprises processing circuitry 56 configured to store (Block S100) a mapping of a plurality of third-party sensor signals to a plurality of translated third-party signals, detect (Block S102) a first third-party sensor signal emitted from the third-party sensor 24, determine (Block S104) the first third-party sensor signal maps to a first translated third-party signal based on the mapping and, in response to determining that the first third-party sensor signal maps to the first translated third-party signal, trigger (Block S106), via the at least one terminal, the preconfigured premises device 16.

The preconfigured premises device 16 is configured to cause (Block S108) transmission of an alert signal to the security system controller 12 based on the preconfigured premises device 16 being triggered. The security system controller 12 being configured to receive (Block S110) the alert signal from the preconfigured premises device 16, determine (Block S112) that the alert signal corresponds to the sensor adaptor device 20, determine (Block S114) that the third-party sensor 24 triggered based on the alert signal corresponding to the sensor adaptor device 20, and generate (Block S116) an alert indicating the third-party sensor triggered. One or more of the Blocks indicated by dashed lines in FIG. 5 may be optional steps according to one or more embodiments.

According to one or more embodiments, the preconfigured premises device 16 is a door sensor, window sensor or contact sensor.

According to one or more embodiments, the at least one terminal (e.g., ST1, ST2, etc.) is electrically coupled to the preconfigured premises device 16.

According to one or more embodiments, the first third-party sensor signal is a first audio signal, and where the processing circuitry 56 of the sensor adaptor device 20 is further configured to detect, in the first audio signal at least one of: an alarm noise, a sequence of chirps; or a recorded message.

According to one or more embodiments, the first third-party sensor signal is a first light signal, and where the processing circuitry 56 of the sensor adaptor device 20 is further configured to detect at least one of: a blinking light pattern of the first light signal, an intensity of the first light signal, or a wavelength of the first light signal.

According to one or more embodiments, the third-party sensor 24 is not configured to communicate with the security system controller 12 without the sensor adaptor device 20.

According to one or more embodiments, the first translated third-party sensor signal of the third-party sensor 24 is an alarm signal.

According to one or more embodiments, a security system controller 12 is in communication with the preconfigured premises device 16 where the security system controller 12 comprises processing circuitry 30 is configured to: register the preconfigured premises device 16 with the premises security system 11, associate the preconfigured premises device 16 with the third-party sensor 24, in response to receiving the alert signal from the preconfigured premises device 16, determine the third-party sensor 24 emitted an alert signal, and cause transmission of a notification indicating that the third-party sensor device 24 emitted an alert.

According to one or more embodiments, the processing circuitry 30 of the security system controller 12 is further configured to trigger a premises security system 11 alarm based on the alert signal received from the preconfigured premises device 16.

According to one or more embodiments, the sensor adaptor device 20 further comprises an optoisolator (e.g., type of sensor 54) that is electrically coupled to the preconfigured premises device 16 where the optoisolator is configured to receive the first third-party sensor signal emitted from the third-party sensor 24.

Figure 6:
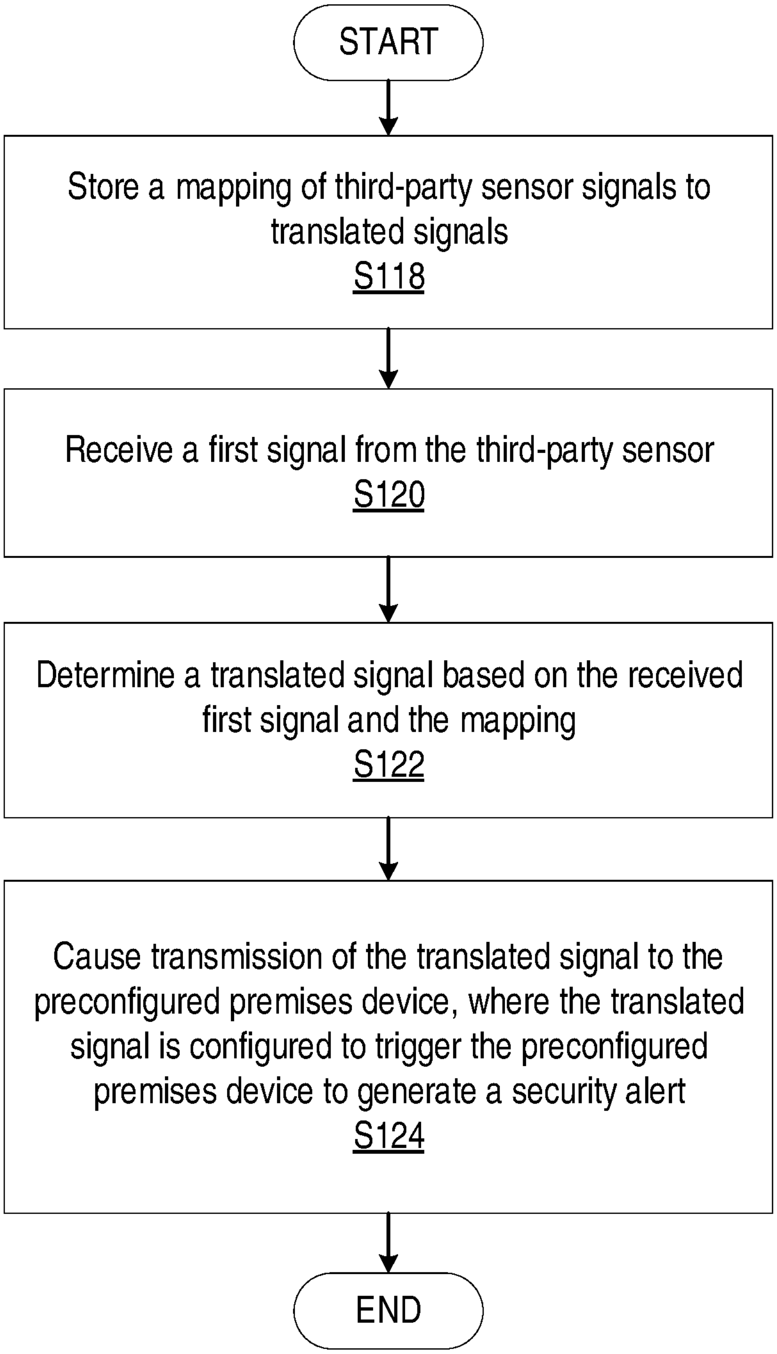
FIG. 6 is a flowchart of an example process performed in a sensor adaptor device according to some embodiments of the present disclosure.

FIG. 6 is a flowchart of an example process in sensor adaptor device 20 according to one or more embodiments of the present disclosure. One or more blocks described herein may be performed by one or more elements of sensor adaptor device 20 such as by one or more of processing circuitry 56 (including the sensor adaptor unit 22), processor 58, etc. The sensor adaptor device 20 is configured to store (Block S118) a mapping of third-party sensor 24 signals to translated signals. Sensor adaptor device 20 is configured to receive (Block S120) a first signal 25 (e.g., first third-party sensor signal) from the third-party sensor 24. Sensor adaptor device 20 is configured to determine (Block S122) a translated signal based on the received first signal 25 and the mapping. The sensor adaptor device 20 is configured to cause transmission (Block S124) of the translated signal to the preconfigured premises device 16, where the translated signal is configured to trigger the preconfigured premises device 16 to generate a security alert.

According to one or more embodiments, the first signal is a first audio signal, the translated signal being a second audio signal, the second audio signal being configured to trigger the preconfigured premises device. According to one or more embodiments, the first signal is a first light signal, the translated signal being a second light signal, the second light signal being configured to trigger the preconfigured premises device 16. According to one or more embodiments, the security alert generated by the preconfigured premises device 16 indicates that at least one sensor of the preconfigured premises device 16 was triggered by a security-related event. According to one or more embodiments, determining the translated signal includes digitizing the received first signal. According to one or more embodiments, the security alert includes the digitized received first signal. According to one or more embodiments, the preconfigured premises device 16 includes a motion sensor, the translated signal being configured to trigger the motion sensor. According to one or more embodiments, the preconfigured premises device 16 includes a proximity sensor, the translated signal being configured to trigger the proximity sensor. According to one or more embodiments, the translated signal is configured to simulate a security-related event associated with the preconfigured premises device 16.

Figure 7:
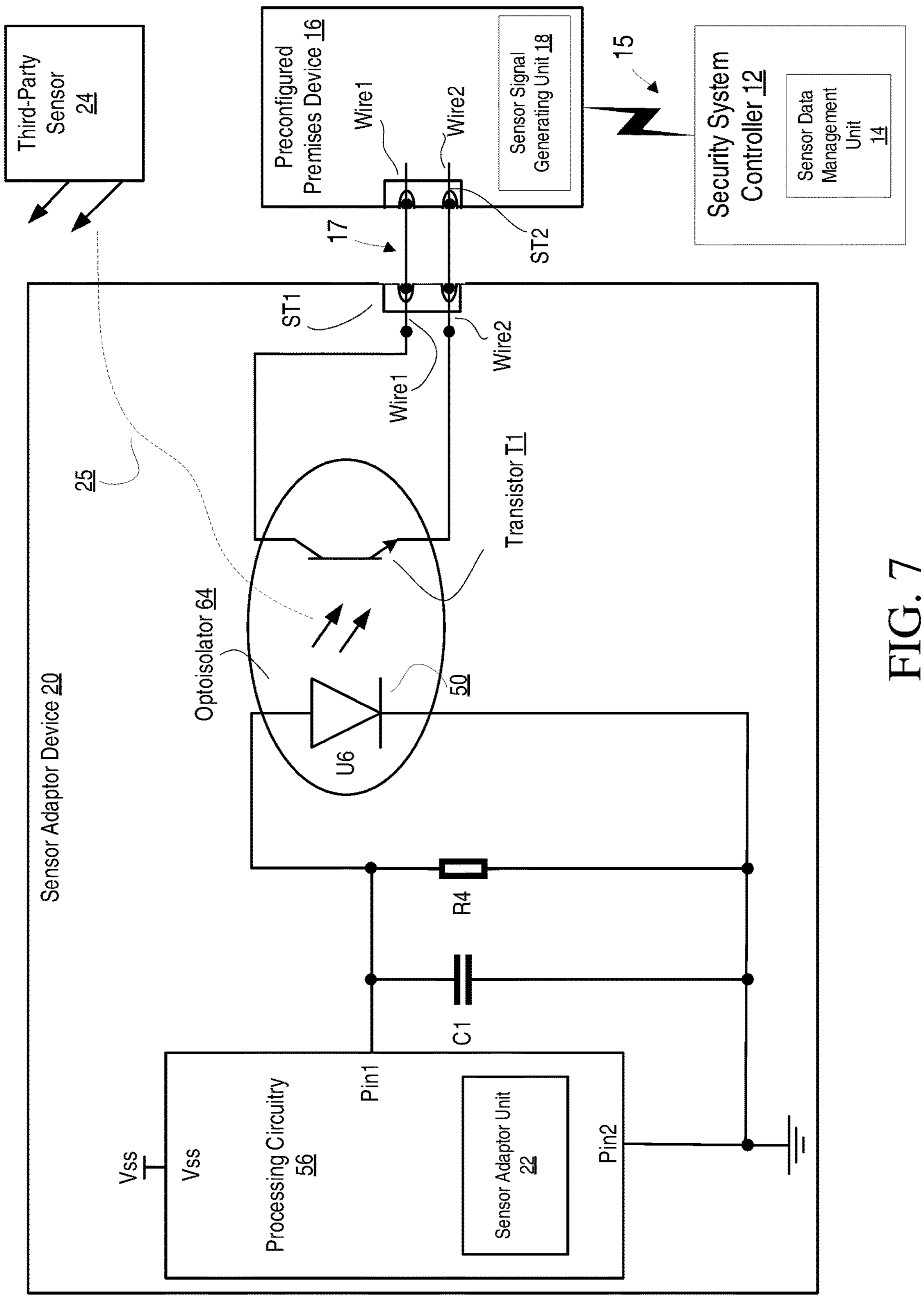
FIG. 7 is a block diagram of an example premises security system according to some embodiments of the present disclosure.

FIG. 7 is a diagram of an example of a premises security system 11 including a security system controller 12, a preconfigured premises device 16, a sensor adaptor device 20, and a third-party sensor 24. An example scenario according to one or more embodiments of the present disclosure is as follows. Third-party sensor 24, which may be any type of safety/security sensor which generates a detectable signal 25, is triggered and emits a signal 25. For example, third-party sensor 24 may be a motion sensor that is triggered by detecting a person moving in the environment to generate a signal 25, which may include one or more of a light/visual signal (e.g., a flashing blue and red light pattern, a text display, etc.), a sound signal (e.g., a high-pitched alarm noise, a particular sequence of chirps, a recorded message, etc.), etc. Sensor adaptor device 20 includes one or more sensors 54 for detecting the signal 25 emitted by third-party sensor 24. For example, as shown in the example configuration of FIG. 7, sensor adaptor device 20 includes a sensor 54 which is configured to detect light, for example, of a particular intensity, wavelength, etc. In the example of FIG. 7, the sensor 54 is realized using a photosensitive diode U6, but other circuit configurations and sub-components for detecting signals 25 may be used. For example, optoisolator 64 may be configured to use photosensitive diode U6 to detect ON and/or OFF signaling (e.g., LED blinking) from third-party sensor 24. In another example, optoisolator 64 is used to determine a color of the emitted light signal from third-party sensor 24. In this example, three photosensitive diodes U6 may be used, where the difference in current among the three photosensitive diodes U6 correspond to one of a plurality of detectable colors.

When the sensor 54 of the sensor adaptor device 20 is triggered by signal 25, processing circuitry 56, including sensor adaptor unit 22, receives data/signals output by the sensor 54. For example, sensor 54 may receive a blue light signal which pulses three times every second, and may generate (e.g., using an analog to digital converter) a corresponding data/signal (e.g., a data packet indicating that light was received at x intensity, y frequency, at timestamps T1=0.3 seconds, T2=0.6 seconds, and T3=0.9 seconds). Sensor adaptor unit 22 may be preconfigured with a mapping of signals 25 to signal definitions. For example, in the case where the third-party sensor 24 is a window sensor, the mapping may indicate that a "blue light which pulses three times in a second" maps to "window shut", and that a "red light which pulses six times in a second" maps to "window open". The same principles may be applied in the case of other types of signals, e.g., an audio signal which chirps three times at a frequency x maps to "window shut," whereas an audio signal which chirps six times at frequency y maps to "window open".

The mapping of signals 25 to signals definitions may be preconfigured, e.g., sensor adaptor unit 22 and/or memory 60 may include a library of signals and corresponding signal definitions, and/or the mapping may be input by a user/technician, such as during installation of premises security system 11. For example, a technician may be tasked with adding a third-party sensor 24 to premises security system 11. The technician may determine, e.g., by referring to an instruction manual for third-party sensor 24 and/or through trial-and-error, that certain signals 25 correspond to particular signal definitions, and may program those definitions, e.g., using a computer terminal (not shown) in communication with sensor adaptor device 20. Alternatively, the technician may indicate to the sensor adaptor device 20 the type (e.g., model number, manufacturer identity, etc.) of third-party sensor 24, and sensor adaptor unit 22 may be configured to load a particular mapping corresponding to that third-party sensor 24, e.g., from a library stored in memory 60 or from a remote server (not shown) in communication with sensor adaptor device 20. In one or more embodiments, the mapping may be provided by a table that maps signal 25 to a specific alert, command, indication, etc.

As another example, the sensor adaptor device 20 may be preconfigured with a mapping of third-party sensors 24 and signals 25 generated by such devices, and may be configured to detect signals 25 and determine based thereon which third-party device 24 is generating signals 25. For example, a particular third-party sensor 24 may emit a particular variety of signals 25 (e.g., light patterns) under various conditions, and sensor adaptor device 20 may record the detected signals 25 over time to determine the identity of third-party sensor 24 based on the stored mapping and recorded signals 25. Once the identity of third-party sensor 24 is determined, the sensor adaptor device 20 may then apply a specific mapping for that third-party sensor 24, which includes the various signals 25 emitted by third-party sensor 24 and the corresponding meaning, indication, event, and/or alert associated with each of the various signals 25, and may use that information to translate each of the various signals 25 into a corresponding signal which will trigger the preconfigured premises device 16 accordingly.

Once the appropriate input signal 25 mapping is confirmed by the sensor adaptor unit 22 (e.g., a blue light that pulses three times), the processing circuitry 56 sends a signal (e.g., a "HIGH" voltage signal) to an optoisolator (e.g., formed by photosensitive diode U6 and transistor T1), which in turn may be wired/coupled to preconfigured premises device 16. Sensor adaptor device 20, such as via sensor adaptor unit 22, may be configured to generate translated sensor signals and communicate those signals to preconfigured premises device 16, e.g., via communication channel 17. As shown in FIG. 7, the communication channel 17 may include one or more wires (e.g., Wire1 and Wire2), coupled via screw terminals/ports ST1 and ST2. In the example of FIG. 7, the translation is achieved in part by generating signals using the optoisolator which preconfigured premises device 16 may detect/interpret according to known techniques.

Sensor signal generating unit 18 of preconfigured premises device 16 receives the translated sensor signals from sensor adaptor device 20 and in turn generates sensor data which may be interpreted by security system controller 12, and sends the generated sensor signal and/or data (e.g., via communication channel 15) to the security system controller 12. Sensor signal generating unit 18 may simply forward the sensor data received from sensor adaptor device 20 to security system controller 12, may translate and/or modify the sensor data, e.g., to place it in a form which is readable by security system controller 12, and/or may generate its own sensor signaling and send that to the security system controller 12 (e.g., which may appear to security system controller 12 as if preconfigured premises device 16 was triggered by the event). In some embodiments, preconfigured premises device 16 may require no additional modification beyond establishing the communication channel 17 with sensor adaptor device 20. For example, preconfigured premises device 16 may be an existing device, such as an ADT PG9885 sensor, which includes a signal input port (e.g., ST2 shown in FIG. 7) that may be configurable for receiving a signal from an external device (e.g., sensor adaptor device 20), which may trigger the preconfigured premises device 16 and/or sensor signal generating unit 18 to send an alert/indication/signal to security system controller 12. For example, the signals received from the sensor adaptor device 20 (e.g., as generated by the sensor adaptor unit 22 and optoisolator) may mimic the signals which preconfigured premises device 16 is designed to receive.

The alert, indication, and/or signal may include information indicating the identity of sensor adaptor device 20 and/or of third-party sensor 24. The security system controller 12 may initiate one or more security actions based on the received alert, indication, and/or signal and/or the identity of the source. Alternatively, security system controller 12 may lack awareness of sensor adaptor device 20 and/or third-party sensor 24, and may instead only associate the received alert, indication, and/or signal with the preconfigured premises device 16. In one or more embodiments, the preconfigured premises device 16 may not be configured and/or have the ability to detect a specific alarm condition (e.g., may not have a specific type of sensor needed for detection). In this case, a third-party sensor 24 is added to the premises security system 11 to perform detection of alarm conditions that the preconfigured premises device 16 is unable to perform. The sensor adaptor device 20 allows the preconfigured premises device 16, which may be unable to detect certain alarm conditions, to be able to trigger an alarm for these certain alarm conditions even though the preconfigured premises device 16 may be unable to perform these specific detections. Hence, in one or more embodiments, the security system controller 12 that is in communication with the preconfigured premises device 16 is able to initiate an alarm based on a detection of an alarm condition performed by a third-party sensor 24 without having to configure the third-party sensor 24 to communicate directly with the security system controller 12 (e.g., premise security system controller). Alternatively, third-party sensor 24 may act as a backup or verification sensor perform the same or similar detections as preconfigured premises device 16.

Depending on the type of signal 25 emitted by third-party sensor 24 and/or the environment in which third-party sensor 24 is located, it may be advantageous to place the sensor adaptor device 20 proximal to the third-party sensor 24. For example, the sensor adaptor device may be mountable on the third-party sensor 24, e.g., in an idle-state. For example, in the scenario where the signal 25 includes a light signal (e.g., a pulsed blue light), it may be necessary for sensor adaptor device 20 to be placed such that sensors 54 (e.g., an image sensor) are facing the source of the light signal. In the case where the signal 25 includes an audio signal, it may be necessary for sensor adaptor device 20 to be placed such that sensors 54 are within range of the audio signal, which may vary based on the type of environment (e.g., in a noisy environment, the sensor adaptor device 20 may need to be placed closer to the third-party sensor 24 as compared to a quiet environment). In some embodiments, sensor adaptor device 20 may be configured to provide feedback, for example, to a technician who is configuring and/or installing premises security system 11, where the feedback indicates whether the sensor adaptor device 20 is receiving signals 25 from the third-party sensor 24, the quality and/or strength of the received signals 25, etc., which may be usable by the technician to adjust the placement of the sensor adaptor device 20 relative to the third-party sensor 24.

Hence, in one or more embodiments, sensor adaptor device 20 is able to communicate alarm conditions (e.g., alarm data, sensor data, etc.) sensed by one or more third-party sensors 24 without having to use communication protocols to communicate with the third-party sensor 24. The sensor adaptor device 20 is then able to use an existing communication link and/or channel between a preconfigured premises device 16 and security system controller 12 to forward, transmit, and/or relay the alarm conditions (e.g., alarm data, sensor data, etc.) to the security system controller 12 for analysis and/or trigger of an alarm.

The concepts described herein may be embodied as a method, data processing system, computer program product and/or computer storage media storing an executable computer program. Any process, step, action and/or functionality described herein may be performed by, and/or associated to, a corresponding module, which may be implemented in software and/or firmware and/or hardware. Furthermore, the invention may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:

1. A device, comprising:
- a sensor adaptor configured to communicate with a premises device of a premises security system, the sensor adaptor comprising:
  - processing circuitry configured to:
    - store a mapping of a sensor signal to a translated signal;
    - detect a signal emitted from the premises device;
- determine that the signal is the sensor signal; and
  - in response to determining that the signal is the sensor signal, cause the translated signal to be generated based on the mapping.

2. The device of claim 1, wherein the third-party sensor signal in the mapping is defined by a frequency at which the third-party sensor signal is received.

3. The device of claim 1, wherein the third-party sensor signal in the mapping is defined by a wavelength of light associated with the third-party sensor signal.

4. The device of claim 1, wherein the third-party sensor signal in the mapping is defined by an intensity of light associated with the third-party sensor signal.

5. The device of claim 1, wherein the third-party sensor signal in the mapping is defined by a frequency pitch of the third-party sensor signal.

6. The device of claim 1, wherein the third-party sensor signal in the mapping is defined by a predefined audible message.

7. The device of claim 1, wherein the processing circuitry is further configured to identify the premises device based on the sensor signal.

8. The device of claim 1, wherein the sensor adaptor further comprises at least one terminal configured to electrically couple to the premises device.

9. The device of claim 1, wherein the sensor signal is an audio signal.

10. The device of claim 1, wherein the sensor signal is a light signal.

11. A method implemented by a device, the device comprising a sensor adaptor configured to communicate with a premises device of a premises security system, the method comprising:
- storing a mapping of a sensor signal to a translated signal;
- detecting a signal emitted from the premises device;
- determining that the signal is the sensor signal; and
- in response to determining that the signal is the sensor signal, causing the translated signal to be generated based on the mapping.

12. The method of claim 11, wherein the third-party sensor signal in the mapping is defined by a frequency at which the third-party sensor signal is received.

13. The method of claim 11, wherein the third-party sensor signal in the mapping is defined by a wavelength of light associated with the third-party sensor signal.

14. The method of claim 11, wherein the third-party sensor signal in the mapping is defined by an intensity of light associated with the third-party sensor signal.

15. The method of claim 11, wherein the third-party sensor signal in the mapping is defined by a frequency pitch of the third-party sensor signal.

16. The method of claim 11, wherein the third-party sensor signal in the mapping is defined by a predefined audible message.

17. The method of claim 11, further comprising identifying the premises device based on the sensor signal.

18. The method of claim 11, further comprising electrically coupling to the premises device via at least one terminal of the sensor adaptor.

19. The method of claim 11, wherein the sensor signal is an audio signal.

20. The device of claim 11, wherein the sensor signal is a light signal.

* * * * *